Nov. 3, 1959     T. F. SARAH     2,911,165
PUSH BUTTON TYPE ENCLOSED SPINNING REEL
Filed June 13, 1958     4 Sheets-Sheet 1
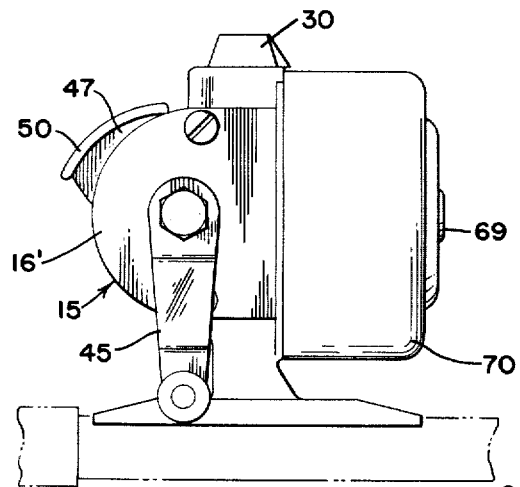
FIG. 1
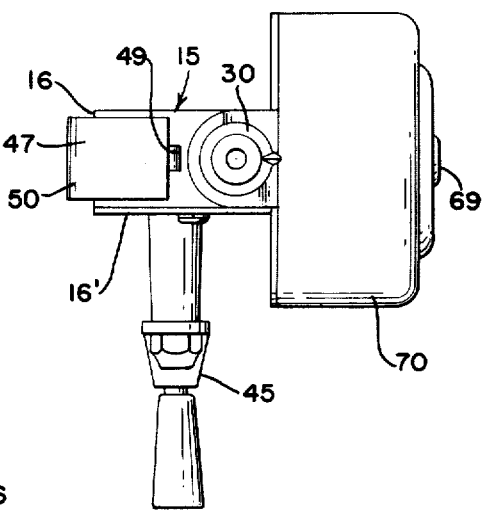
FIG. 2
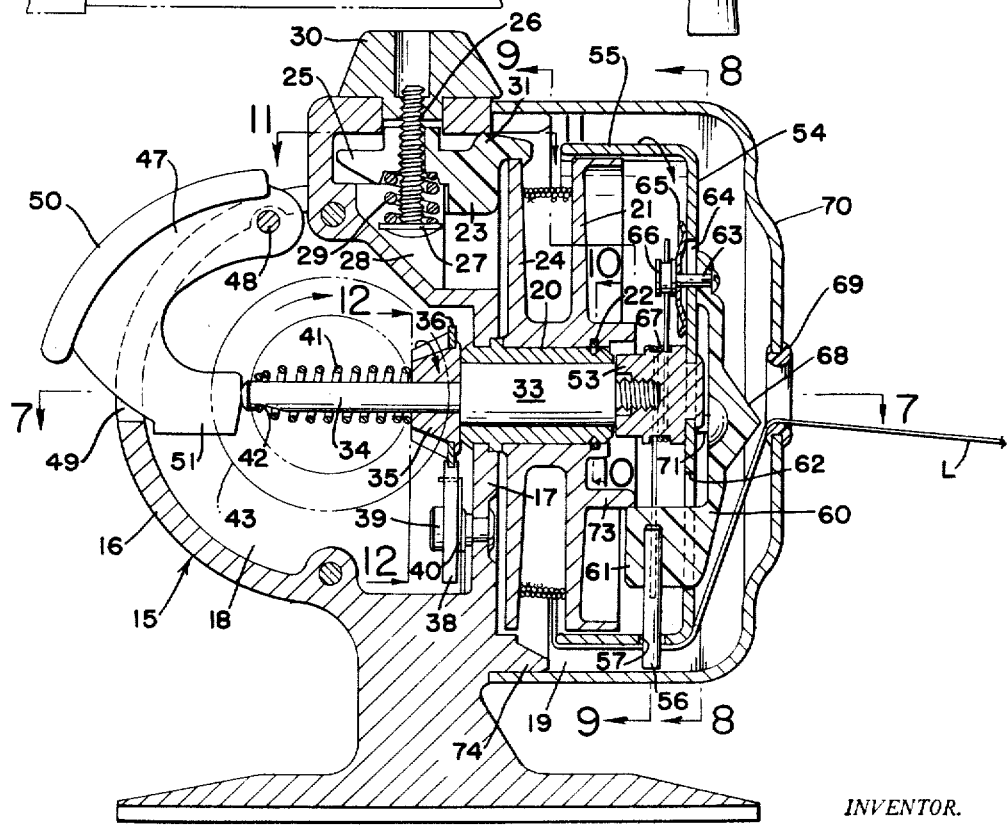
FIG. 3
*INVENTOR.*
THOMAS F. SARAH
BY 
ATTORNEYS Nov. 3, 1959    T. F. SARAH    2,911,165
PUSH BUTTON TYPE ENCLOSED SPINNING REEL
Filed June 13, 1958    4 Sheets-Sheet 2

*INVENTOR.*
THOMAS F. SARAH
BY
ATTORNEYS

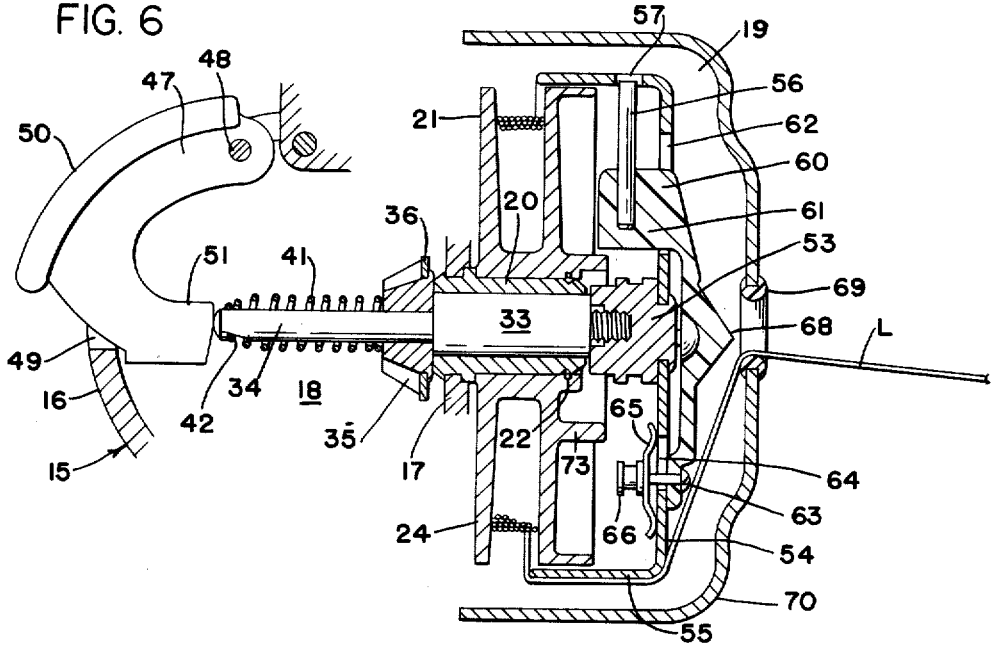
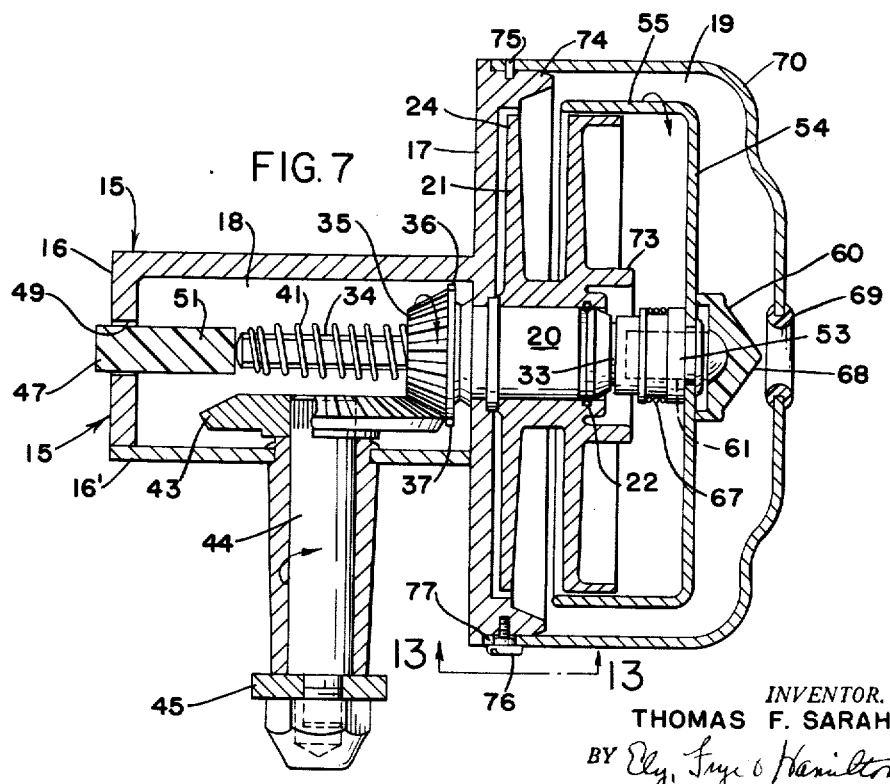

United States Patent Office
2,911,165
Patented Nov. 3, 1959

2,911,165
PUSH BUTTON TYPE ENCLOSED SPINNING REEL

Thomas F. Sarah, Akron, Ohio, assignor to The Enterprise Manufacturing Company, Akron, Ohio, a corporation of Ohio Application June 13, 1958, Serial No. 741,856

5 Claims. (Cl. 242—84.2)

The invention relates generally to fishing reels of the spinning type, and more particularly to spinning reels having a completely enclosed flyer rotatable around a stationary spool to wind the line thereon. The flyer carries a pick-up pin which guides the line onto the spool during winding, and which is retracted during casting to allow the line to spin or unwind from the spool.

In certain prior spinning reels of this type the mechanism for extending and retracting the pick-up pin at the proper times is relatively complicated and expensive, as well as likely to get out of adjustment.

It is an object of the present invention to provide a simple and economical spinning reel construction in which actuation of a push button lever snubs the line at the start of a cast, and simultaneously retracts the pick-up pin.

Another object is to provide an improved reel in which actuation of the push button lever will snub the line at the end of a cast.

A further object is to provide an improved reel having novel mechanism for automatically extending the pick-up pin at the start of a rewinding operation.

These and other objects are accomplished by the improved construction comprising the present invention, a preferred embodiment of which is shown by way of example in the accompanying drawings and described in detail in the following specification.

The reel of the present invention is provided with a pin carrier member on the flyer having a projection for entering the line guide eyelet in the housing to snub the line when the push button lever is pressed, and the entering engagement of the projection into the eyelet moves the pin carrier radially and retracts the pin. A cam on the spool engages the pin carrier to eject the pin at the start of the winding operation.

Referring to the drawings:

Fig. 1 is a side elevation of the improved reel as mounted on a casting rod.

Fig. 2 is a top plan view thereof.

Fig. 3 is an enlarged vertical sectional view thereof, showing the pick-up pin ejected and engaging the line at the start of a rewinding operation.

Fig. 6 is a similar view showing how the cam on the spool engages the pin carrier to eject the pin at the start of a rewinding operation.

Fig. 7 is a plan sectional view on line 7—7 of Fig. 3.

Figure 10:
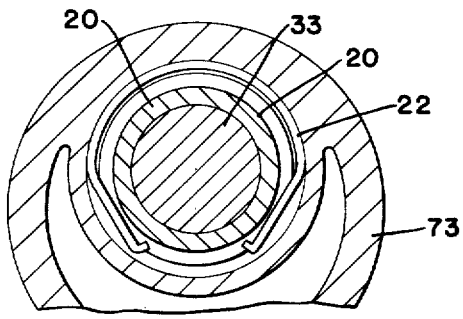
Fig. 10 is a fragmentary sectional view on line 10—10 of Fig. 3.

Referring to Figs. 1–3, the improved reel preferably includes a gear housing 15 having a rounded rear wall 16 and a side plate 16' enclosing the housing. A partition wall 17 separates the gear compartment 18 from a spool compartment 19. A bushing 20 is mounted in the partition wall 17 and extends into the spool compartment, and the line spool 21 is rotatably mounted on the bushing and held in place by a snap ring 22 (Fig. 10).

The spool 21 is normally prevented from rotating by a friction brake shoe 23 preferably engaging the rear flange 24 of the spool. The shoe may be of plastic material such as nylon, and has a slot 25 in its rear end through which an adjusting screw 26 passes. The head 27 of the screw is squared and fits slidably and non-rotatably in a slot 28 in the housing, and a spring 29 is interposed between the head 27 and the shoe 23. The outer end of the screw is threaded in an adjusting nut 30 on the exterior of the housing. The shoe has a raised portion 31 which fulcrums on the interior of the housing to apply increasing friction on the spool flange 24 as the adjusting screw is taken up by the nut 30.

Figure 12:
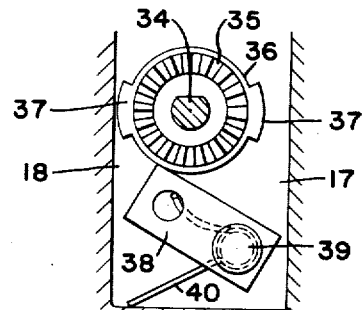
Fig. 12 is a fragmentary sectional view on line 12—12 of Fig. 3.

A shaft 33 for rotating the flyer is slidably mounted within the bushing 20, and the rear end portion 34 of the shaft is reduced in diameter and extends rearwardly through the gear compartment. As shown in Fig. 12, the shaft portion 34 is flat on one side, and a bevel gear pinion 35 is non-rotatively secured thereon. An anti-reverse mechanism to prevent reverse rotation of the flyer may be provided and includes a plate 36 on the base of the pinion 35 having diametrically opposite teeth 37 adapted to engage the corner of a ratchet plate 38 as the pinion is rotated. The ratchet plate 38 is pivoted on the partition wall 17 by a pin 39 and urged against the edge of plate 36 by a spring 40 wrapped around the pin.

A coil spring 41 surrounds the shaft portion 34 and the front end of the spring abuts the pinion 35 while the rear end is secured in a notch 42 on the shaft. Thus, the spring 41 urges the shaft 34 rearwardly to the position of Fig. 3. The bevel pinion 35 meshes with the usual driving gear indicated at 43 in Fig. 7, and the gear 43 is mounted on a crankshaft 44 rotated by means of the usual crank handle 45 shown in Figs. 1 and 2.

The push button or thumb lever 47 for pushing the shaft forwardly against the action of spring 41 is pivoted at 48 in a slot 49 in the gear housing 15, and has an outer flange 50 overhanging the slot and limiting inward movement of the lever. The lower inner end 51 of the lever abuts the rear end of shaft portion 34.

The front end of shaft 33 has a flyer mounting nut 53 screwed thereon and a cup-shaped flyer 54 is swaged or otherwise secured on the front end of said nut. The skirt flange 55 of the flyer extends rearwardly over the front flange of the spool 21. In the position of Fig. 3, the pick-up pin 56 extends radially of the flyer through a hole 57 in skirt flange 55, in which position it catches the line L when the flyer is rotated and winds the line on the spool 21.

The pin 56 is mounted in a pin holder or slide 60 which is preferably made of plastic material such as nylon, and is slidable radially on the front face of the flyer 54. One end of the slide 60 has a lug 61 projecting rearwardly through a radial slot 62 in the flyer, and the pin 56 projects radially from the lug 61 into the hole 57 in skirt flange 55. The other end of the slide has a bolt 63 therein extending through a radial slot 64 in the flyer, and a spring washer 65 between the head 66 of the bolt and the underside of the flyer yieldingly holds the slide in position. Additional means to yieldingly maintain the slide in position may comprise a wire spring 67 wrapped around mounting nut 53 and having one end engaging the side of bolt 66 and the side of lug 61.

Figure 4:
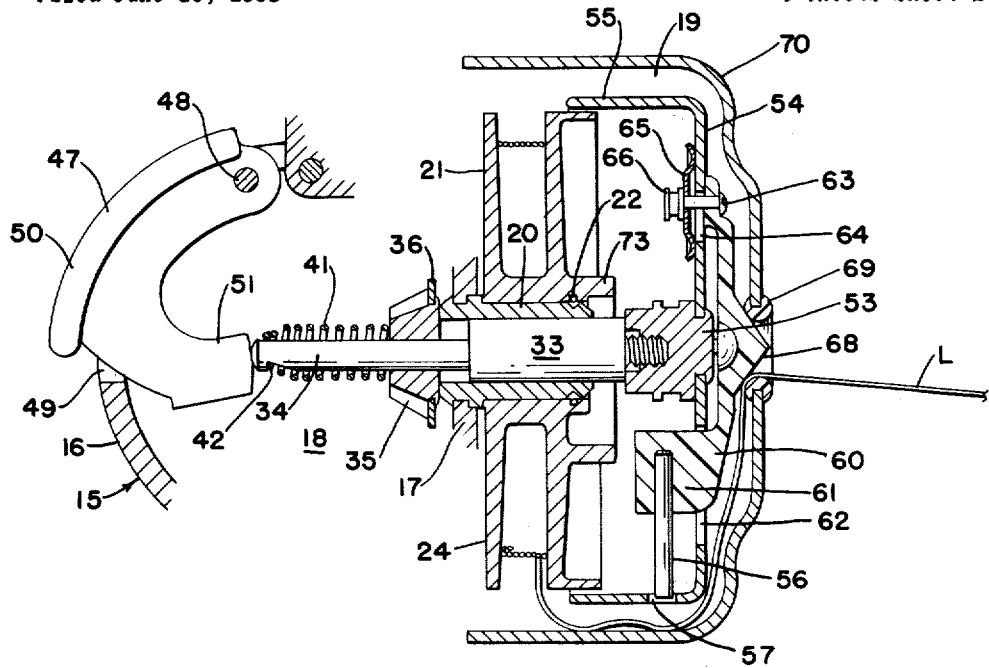
Fig. 4 is a similar view showing the projection on the pin carrier fully entered into the line guide eyelet by depressing the push button lever, to snub the line and retract the pin at the start of a cast.

Between its ends the outer face of the pin holder or slide 60 has a conical projection 68 which is adapted to enter the line guide eyelet 69 in the cover cap 70 enclosing the flyer and spool. As shown in Fig. 3, when the pickup pin 56 is ejected or extended radially, the cone 68 is offset from the center of eyelet 69, but the point of the cone is aligned with the inner edge of the eyelet. Accordingly, when the thumb lever 47 is pressed to push the shaft 33 and flyer 54 forwardly, the inclined face of the cone first engages the eyelet and snubs the line L between the cone and eyelet, and then slides over the edge of the eyelet and moves the slide radially inward until the cone is centered in the eyelet as shown in Fig. 4. During this movement, the cone 68 is backed up or supported by laterally spaced rearwardly projecting feet 71 slidably abutting the front face of the flyer 54.

Figure 5:
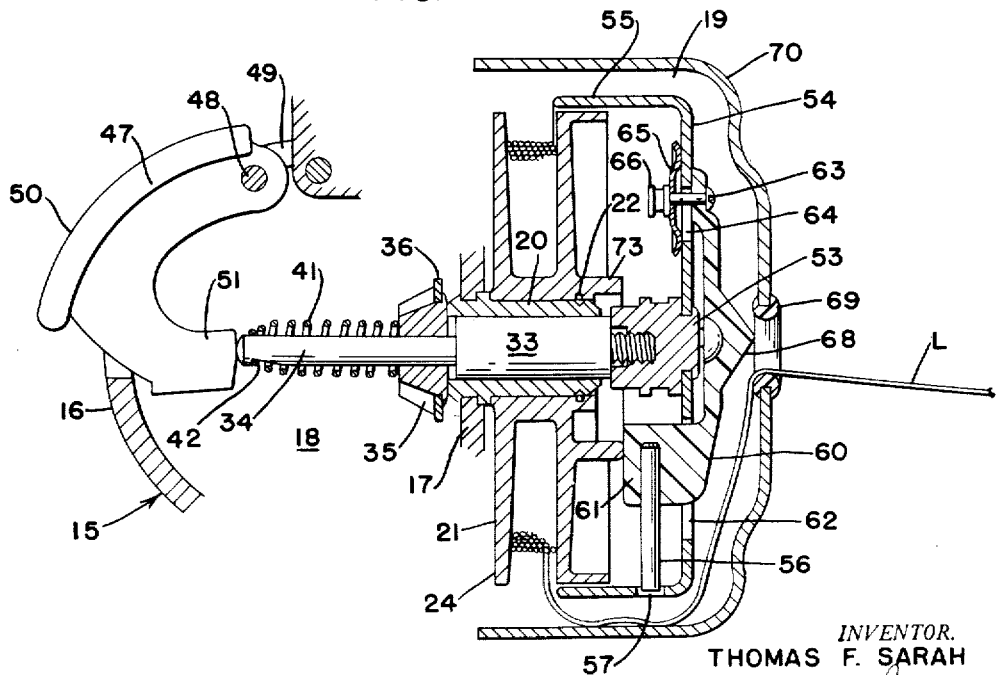
Fig. 5 is a similar view showing the push button lever released to allow the line to spin from the spool.
Figure 8:
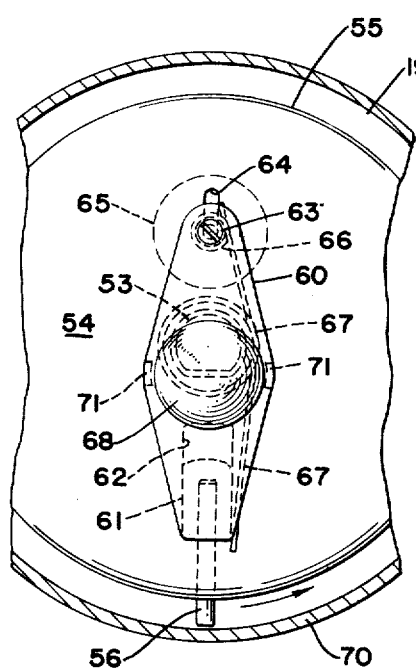
Fig. 8 is a transverse sectional view on line 8—8 of Fig. 3.
Figure 9:
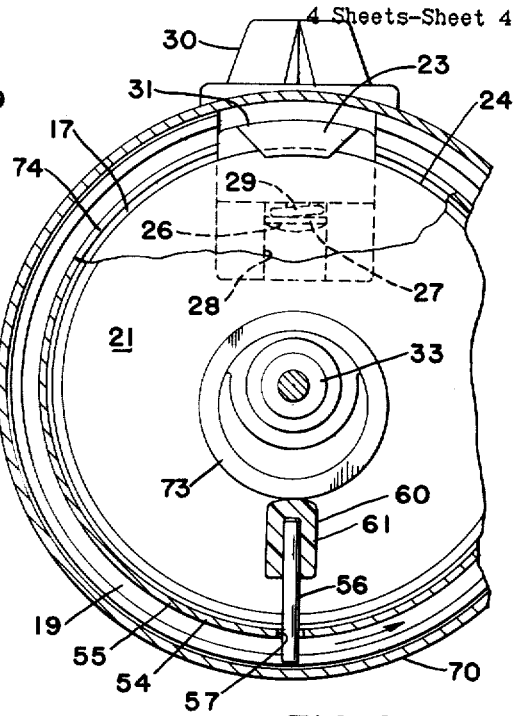
Fig. 9 is a transverse sectional view as on line 9—9 of Fig. 3.

As the slide 60 is moved to the position of Fig. 4, by engagement of the cone 68 in the eyelet 69, the pin 56 moves to the retracted position as shown, so that when the thumb lever is released, as shown in Fig. 5, the line L is free to spin from the spool 21, and pressing the lever 47 will again snub the line with the pin retracted.

The means for moving the slide radially outward to eject the pin 56 through hole 57 to pick up the line L, comprises an annular cam 73 projecting forwardly from the spool 21 and positioned eccentrically of the shaft 33. This cam cooperates with the lug 61 on slide 60 as the flyer is rotated to move the slide radially outward, as shown in Fig. 3. Referring to Figs. 5 and 6, when the thumb lever 47 is released, if the lug 61 is returned so that it abuts the outermost part of cam 73, a partial rotation of the flyer will allow the lug to slide rearwardly over the cam, as urged by spring 41, to the position of Fig. 6, whereupon during further rotation of the flyer through about a half turn the rotative abutment between the radially outer cam surface and the lug 61 will move the slide and pin radially outward to the position of Fig. 3.

Figure 13:
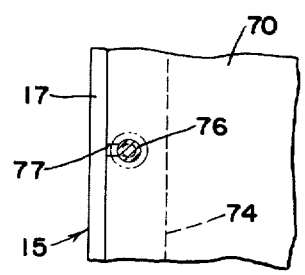
Fig. 13 is a fragmentary elevation on line 13—13 of Fig. 7.
Figure 11:
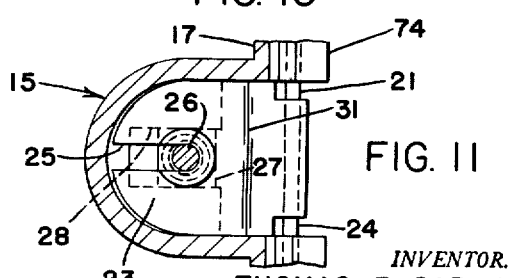
Fig. 11 is a fragmentary sectional view on line 11—11 of Fig. 3.

The cover 70 telescopes over an annular flange 74 on the housing, as shown in Fig. 7, and is secured thereon by a pivot pin 75 and a diametrically opposite screw 76 passing through a slot 77 in the edge of the cover. (See Fig. 13.)

In the operation of the improved reel, assuming that the fisherman has completed rewinding or reeling in the line L and the parts are in the position of Fig. 3, in preparing to cast the fisherman presses inwardly on the lever 47 with his thumb and holds the lever in this position until the cast is started, at which time he releases the lever to release the line. When the lever is first pressed in, the cone 68 snubs the line at the eyelet 69 and then slides or "cams" laterally over the edge of the eyelet until it is centered as in Fig. 4 with the pick-up pin retracted. In order to permit this lateral centering movement of the cone the lug 61 of the slide 60 is designed to move forwardly away from eccentric cam 73 just before the cone engages the eyelet 69.

As the lever 47 is released at the start of the cast, the spring 41 moves the shaft 33 and flyer 64 rearwardly to the position of Fig. 5 and the line is free to spin from the spool. If desired, the fisherman may again snub the line as the lure strikes the water by pressing the thumb lever. When rewinding is started by turning the crank handle 45, the eccentric cam ejects the pick-up pin 56 in the manner previously described, to catch and wind the line on the spool.

The improved reel is simple and economical in construction and operation, and provides a push button type lever for snubbing the line and simultaneously freeing the line from the pick-up pin at the start of a cast or for snubbing the line at the end of a cast, while the start of the rewinding operation automatically ejects the pin to catch and wind the line.

Various modifications and changes in details of construction are contemplated within the scope of the invention defined in the claims.

What is claimed is:

1. In a spinning reel having a normally stationary spool, a flyer rotatably mounted adjacent to the spool and a front cover surrounding the flyer and having a central line guide eyelet, a shaft axially and rotatably movable in said spool and attached to said flyer, spring means urging said shaft rearwardly, a push lever for moving said shaft forwardly, a slide mounted on said flyer for radial movement and having a line pick-up pin at its outer periphery, a cam on said spool for engaging said slide on rotation of the flyer to move the slide radially outward and extend the pin, and an inclined projection on said slide for engaging into said eyelet to move the slide radially inward and retract the pin when the flyer is moved forwardly.

2. In a spinning reel having a normally stationary spool, a flyer rotatably mounted adjacent to the spool and a front cover surrounding the flyer and having a central line guide eyelet, a shaft axially and rotatably movable in said spool and attached to said flyer, spring means urging said shaft rearwardly, a push lever for moving said shaft forwardly, a slide mounted on said flyer for radial movement and having a line pick-up pin at its outer periphery, a cam on said spool for engaging said slide on rotation of the flyer to move the slide radially outward and extend the pin, an inclined projection on said slide for engaging into said eyelet to move the slide radially inward and retract the pin when the flyer is moved forwardly, and spring means to yieldingly hold said slide in radially adjusted position.

3. In a spinning reel having a normally stationary spool, a flyer rotatably mounted adjacent to the spool and a front cover surrounding the flyer and having a central line guide eyelet, a shaft axially and rotatably movable in said spool and attached to said flyer, spring means urging said shaft rearwardly, a push lever for moving said shaft forwardly, a slide mounted on said flyer for radial movement and having a line pick-up pin at its outer periphery, a cam on said spool for engaging said slide on rotation of the flyer to move the slide radially outward and extend the pin, and a cone on said slide projecting forwardly of said flyer for engaging the inner edge of said eyelet when the flyer is moved forwardly with the pin extended, whereby the slide is moved radially inward to retract the pin as the cone centers in the eyelet.

4. In a spinning reel having a normally stationary spool, a flyer rotatably mounted adjacent to the spool and a front cover surrounding the flyer and having a central line guide eyelet, a shaft axially and rotatably movable in said spool and attached to said flyer, spring means urging said shaft rearwardly, a push lever for moving said shaft forwardly, a slide mounted on the front of said flyer for radial movement and having a lug projecting rearwardly therethrough, a pick-up pin on said lug extensible through the outer periphery of said flyer, a cam on said spool for engaging said lug on rotation of the flyer to move the slide radially and extend the pin, and an inclined projection on the front of the slide for engaging into said eyelet to move the slide radially inward and retract the pin when the flyer is moved forwardly.

5. In a spinning reel having a normally stationary spool, a flyer rotatably mounted adjacent to the spool and a front cover surrounding the flyer and having a central line guide eyelet, a shaft axially and rotatably movable in said spool and attached to said flyer, spring means urging said shaft rearwardly, a push lever for moving said shaft forwardly, a slide mounted on the front of said flyer for radial movement and having a lug projecting rearwardly therethrough, a pick-up pin on said lug extensible through the outer periphery of said flyer, a cam on said spool for engaging said lug on rotation of the flyer to move the slide radially and extend the pin, an inclined projection on the front of the slide for engaging into said eyelet to move the slide radially inward and retract the pin when the flyer is moved forwardly, and spring means yieldingly urging the slide against the flyer to hold the slide in radially adjusted position.

References Cited in the file of this patent

UNITED STATES PATENTS

| | | |
|---|---|---|
| 2,644,647 | Denison et al. | July 7, 1953 |
| 2,828,088 | Denison et al. | Mar. 25, 1958 |
| 2,862,679 | Denison et al. | Dec. 2, 1958 |

UNITED STATES PATENT OFFICE
CERTIFICATE OF CORRECTION

Patent No. 2,911,165                                            November 3, 1959

Thomas F. Sarah

It is hereby certified that error appears in the printed specification of the above numbered patent requiring correction and that the said Letters Patent should read as corrected below.

Column 3, line 35, for "returned" read -- turned --.

Signed and sealed this 12th day of April 1960.

(SEAL)
Attest:

KARL H. AXLINE
Attesting Officer

ROBERT C. WATSON
Commissioner of Patents